United States Patent
Curran et al.

(10) Patent No.: US 8,234,351 B2
(45) Date of Patent: *Jul. 31, 2012

(54) SYSTEMS FOR GENERATING AND REGISTERING ENHANCED DOMAIN NAMES

(75) Inventors: Nathan Curran, Phoenix, AZ (US); Justin Jilg, Mesa, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 526 days.

This patent is subject to a terminal disclaimer.

(21) Appl. No.: 12/179,354

(22) Filed: Jul. 24, 2008

(65) Prior Publication Data

US 2008/0307049 A1    Dec. 11, 2008

(51) Int. Cl.
G06F 15/16    (2006.01)
G06F 15/173    (2006.01)

(52) U.S. Cl. ........ 709/218; 709/203; 709/206; 709/217; 709/223

(58) Field of Classification Search .................... 709/217
See application file for complete search history.

(56) References Cited

U.S. PATENT DOCUMENTS

| | | | |
|---|---|---|---|
| 6,298,341 B1 | 10/2001 | Mann et al. | |
| 6,332,158 B1 | 12/2001 | Risley et al. | |
| 6,519,589 B2 | 2/2003 | Mann et al. | |
| 6,560,634 B1 | 5/2003 | Broadhurst | |
| 6,654,804 B1 | 11/2003 | Fleming | |
| 6,745,248 B1 | 6/2004 | Gardos et al. | |
| 6,789,103 B1 | 9/2004 | Kim et al. | |
| 6,842,769 B1 | 1/2005 | Kim et al. | |
| 6,868,444 B1 | 3/2005 | Kim et al. | |
| 6,880,007 B1 | 4/2005 | Gardos et al. | |
| 2002/0065903 A1 | 5/2002 | Fellman | |
| 2002/0091703 A1 | 7/2002 | Bayles | |
| 2002/0091827 A1* | 7/2002 | King et al. | 709/226 |
| 2002/0099693 A1 | 7/2002 | Kofsky | |
| 2002/0129013 A1 | 9/2002 | Thomas | |
| 2003/0149690 A1 | 8/2003 | Kudlacik et al. | |
| 2004/0006597 A1 | 1/2004 | Hughes | |
| 2004/0044791 A1 | 3/2004 | Pouzzner | |
| 2004/0199493 A1 | 10/2004 | Ruiz et al. | |
| 2004/0199520 A1 | 10/2004 | Ruiz et al. | |
| 2004/0220903 A1 | 11/2004 | Shah et al. | |
| 2005/0102354 A1 | 5/2005 | Hollenbeck et al. | |
| 2006/0200751 A1* | 9/2006 | Underwood et al. | 715/501.1 |
| 2006/0271668 A1 | 11/2006 | Parsons et al. | |
| 2006/0287936 A1* | 12/2006 | Jacobson | 709/203 |
| 2007/0094411 A1* | 4/2007 | Mullane et al. | 709/245 |

(Continued)

OTHER PUBLICATIONS

Braden, RFC 1123, Requirements for Internet Hosts—Application and Support, Oct. 1989.

(Continued)

*Primary Examiner* — Ian N Moore
*Assistant Examiner* — Jenee Alexander
(74) *Attorney, Agent, or Firm* — Karl A. Fazio

(57) ABSTRACT

Systems of the present inventions allow for generating and providing an enhanced domain name. An exemplary system may comprise a domain name stored in a network storage device, a web space associated with the domain name, at least one application associated with the domain name and stored on at least one applications server, and a network communicatively coupling the network storage device, web space, and at least one application server, wherein the web space and application may be automatically enabled upon association with the domain name.

11 Claims, 19 Drawing Sheets

U.S. PATENT DOCUMENTS

2007/0192493 A1* 8/2007 Manolache et al. .......... 709/226
2008/0034040 A1* 2/2008 Wherry et al. ................ 709/204
2008/0147856 A1 6/2008 Lee et al.
2008/0201487 A1* 8/2008 Blinn et al. ................... 709/245

OTHER PUBLICATIONS

Unpublished U.S. Appl. No. 11/708,737.
Unpublished U.S. Appl. No. 11/708,736.
Unpublished U.S. Appl. No. 11/708,729.
Unpublished U.S. Appl. No. 11/708,976.
Unpublished U.S. Appl. No. 12/136,659.
Unpublished U.S. Appl. No. 12/136,677.
Mar. 3, 2010 Office Action in related U.S. Appl. No. 12/179,326.
Apr. 2, 2010 response to Mar. 3, 2010 Office Action in related U.S. Appl. No. 12/179,326.
Jun. 28, 2010 Office Action in related U.S. Appl. No. 12/179,326.
Aug. 28, 2010 response to Jun. 28, 2010 Office Action in related U.S. Appl. No. 12/179,326.
Nov. 3, 2011 office action in related U.S. Appl. No. 12/179,326.
Jan. 31, 2012 response to Nov. 3, 2011 office action in related U.S. Appl. No. 12/179,326.

* cited by examiner

Enhanced Domain Name
200

Domain Name
201

Web Space
202

Applications
203

FIG. 2

SYSTEMS FOR GENERATING AND REGISTERING ENHANCED DOMAIN NAMES

CROSS REFERENCE TO RELATED PATENT APPLICATIONS

This patent application is related to U.S. patent application Ser. No. 12/179,326 entitled: "Enhanced Domain Name Generation and Registration" concurrently filed herewith and also assigned to Go Daddy Operaing Company, LLC.

FIELD OF THE INVENTION

The present inventions generally relate to establishing a presence on the Internet and, more specifically, enhanced domain name generation and registration.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related webpages. Websites, unless extremely large and complex or have unusual traffic demands, typically reside on a single server and are prepared and maintained by a single individual or entity. Menus and links may be used to move between different webpages within the website or to move to a different website as is known in the art. The interconnectivity of webpages enabled by the Internet can make it difficult for Internet users to tell where one website ends and another begins.

Websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. Otherwise, the Internet user may keep selecting alternative domain names until an available domain name is found. Domain names are typically registered for a period of one to ten years with first rights to continually re-register the domain name.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting service providers typically provide the hardware, software, and electronic communication means necessary to connect multiple websites to the Internet. A single hosting service provider may literally host thousands of websites on one or more hosting servers.

Hosting service providers often sell website hosting services based upon the content provider's anticipated memory and/or bandwidth needs. For example, a content provider may pay a lower monthly fee for 100 gigabytes (GB) of memory (server disk space) and 1000 GB of bandwidth than another content provider whose website may require 500 GB and 5000 GB of server disk space and bandwidth, respectively. Content providers must evaluate their website's anticipated storage and bandwidth needs and select their hosting service plan accordingly.

Applicant has noticed that, however, that presently-existing systems and methods require a domain name registrant wishing to establish an online presence to navigate through a complicated series of steps to do so. First, he must register a domain name. He must then purchase, configure, and implement a hosting service plan, and perhaps a variety of software applications to add functionality to his website. This process can be complicated, time-consuming, and fraught with opportunity for user error. For the foregoing reasons, there is a need for the systems and methods for providing enhanced domain names and related functionality as described herein.

SUMMARY OF THE INVENTION

The limitations cited above and others are substantially overcome through the systems and methods disclosed herein, which allow for providing enhanced domain names and related functionality.

An exemplary method for providing an enhanced domain name may comprise the step of providing an enhanced domain to a second party. The enhanced domain may comprise a domain name, a web space automatically enabled and associated with the domain name, and at least one application automatically enabled and associated with the domain name.

An example embodiment of a system for providing an enhanced domain name may comprise a domain name stored in a network storage device, a web space associated with the domain name, at least one application associated with the domain name and stored on at least one applications server, and a network communicatively coupling the network storage device, web space, and at least one application server, wherein the web space and application may be automatically enabled upon association with the domain name.

The above features and advantages of the present inventions will be better understood from the following detailed description taken in conjunction with the accompanying drawings.

BRIEF DESCRIPTION OF THE DRAWINGS

FIG. 2 illustrates a possible embodiment of an enhanced domain name.

DETAILED DESCRIPTION

Figure 1A:
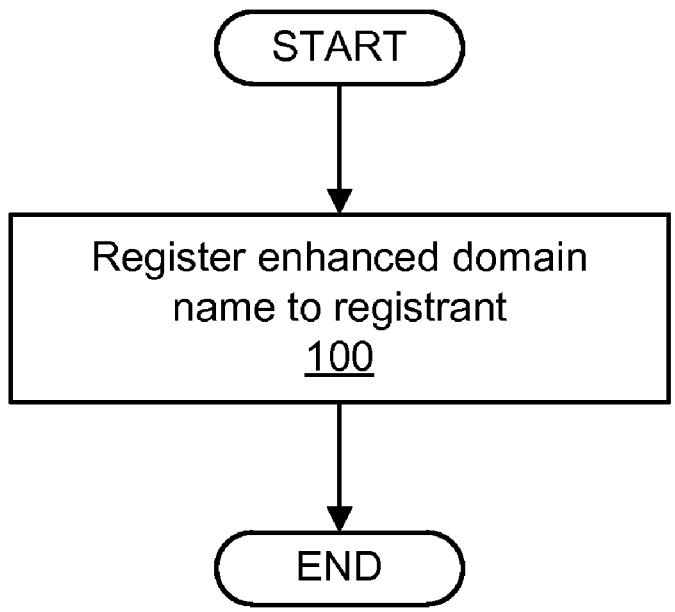
FIG. 1a is a flow diagram illustrating a possible embodiment of a method for providing an enhanced domain name.

The present inventions will now be discussed in detail with regard to the attached drawing figures which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

Enhanced Domain Name Generation and Registration Methods

Figure 1B:
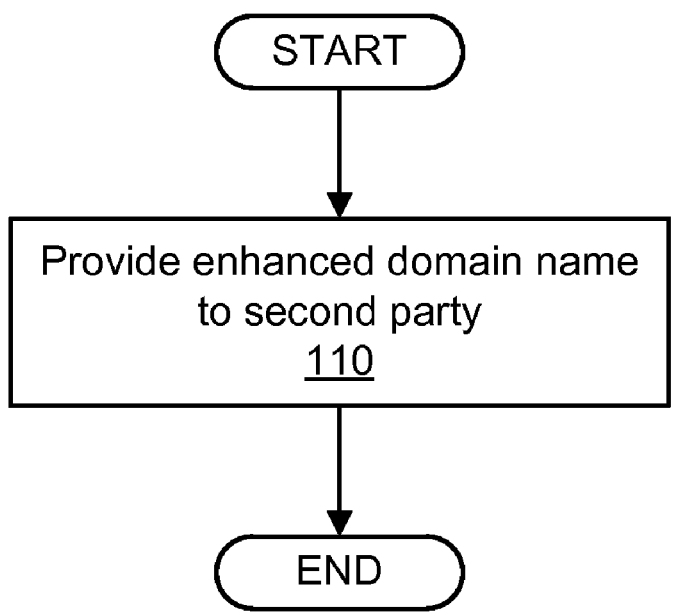
FIG. 1b is a flow diagram illustrating a possible embodiment of a method for providing an enhanced domain name

FIG. 1a illustrates a streamlined embodiment of a method for providing an enhanced domain name 200, wherein an enhanced domain name 200 may be registered to a registrant (Step 100). The enhanced domain name 200 may be registered (Step 100) by any domain name registration method known in the art or developed in the future, perhaps via a website-enabled domain name 201 purchase and registration system, such as that described in detail above and/or may be available on GODADDY.COM's website. FIG. 1b illustrates that the present inventions are not limited to being performed during the domain name registration process. In the embodiment illustrated in FIG. 1b, the enhanced domain name 200 may be provided (Step 110) by, as non-limiting examples, any individual or entity including, but not limited to a domain name registry, domain name registrar, hosting provider, and/or software application developer or distributor. As illustrated by this example embodiment, any individual or entity that may generate and provide an enhanced domain name 200 may practice the inventions described herein.

Figure 3:
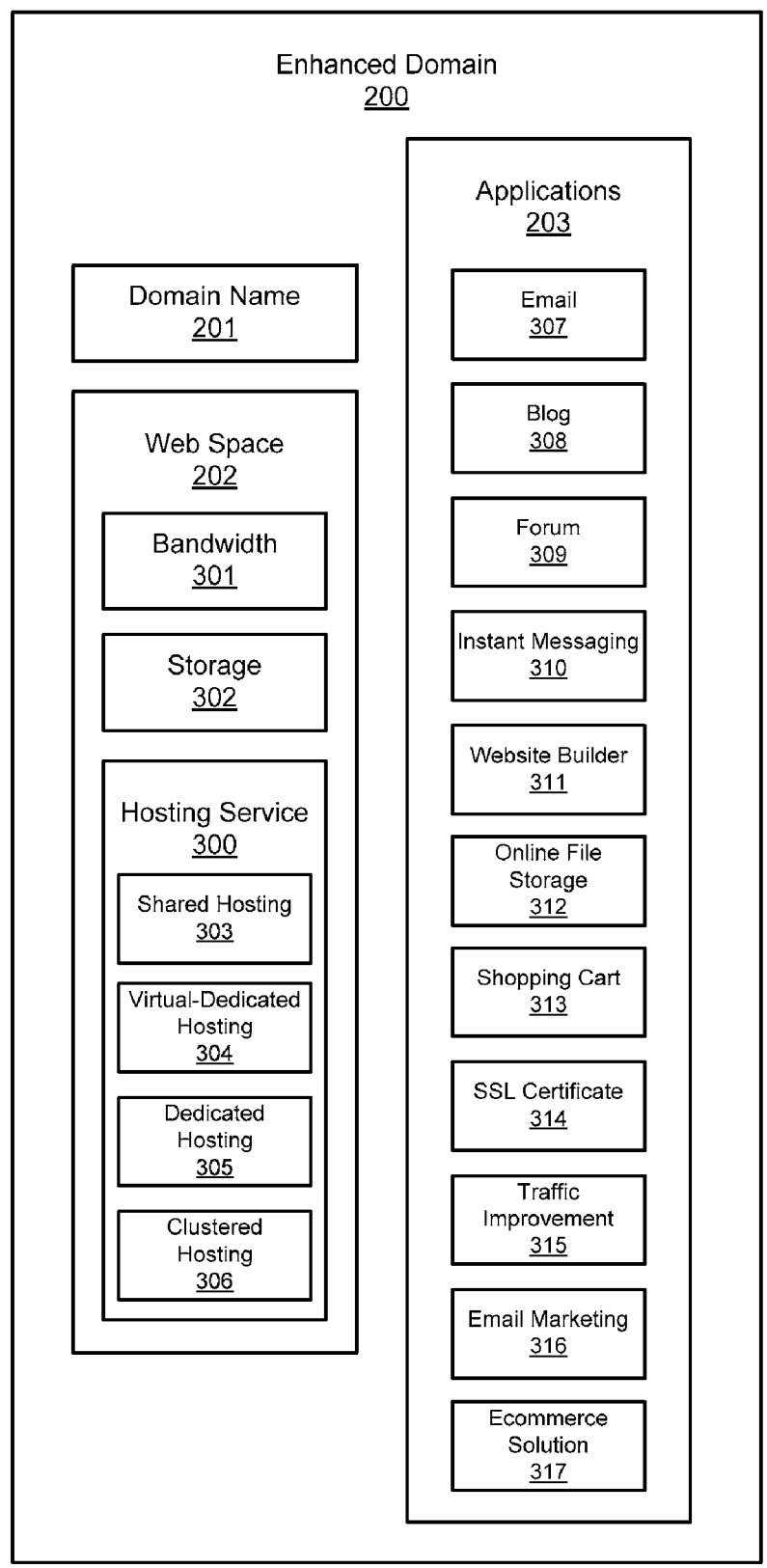
FIG. 3 illustrates a possible embodiment of an enhanced domain name.

As illustrated in FIG. 2, the enhanced domain name 200 may comprise a domain name 201, a web space 202 associated with the domain name 201, and at least one application 203 associated with the domain name 201. "Web space" 202, as the term is used herein, is meant to refer to any data storage and/or data transfer means used to develop and/or establish an online presence. As illustrated in FIG. 3, non-limiting examples of such web space 202 may comprise a hosting service 300, a predetermined bandwidth allotment 301, a predetermined storage allotment 302, and/or any combination thereof. The hosting service 300 may comprise any hosting method known in the art or developed in the future including, but not limited to, a third-party hosting provider's hosting service, such as any of GODADDY.COM's hosting plans. As shown in FIG. 3, the hosting service 300 may utilize shared 303, virtual-dedicated 304, dedicated 305, and/or clustered 306 hosting technology.

With a shared hosting 303 embodiment, many websites may reside on a single server. Each website may be stored in its own partition (i.e., section or place) on the server to keep it separate from other websites. Shared hosting 303 may provide an economical hosting option because numerous hosting customers may share in server maintenance cost. With virtual-dedicated hosting 304, servers also may comprise a single server, but one that is partitioned into multiple (virtual) servers, each of which may have the appearance to the end user of being the users' own dedicated server. Such virtual-dedicated servers may run their own operating system and be independently rebooted. With dedicated hosting 305, the hosting customer may lease a complete server that is dedicated to that customer (i.e., not shared with others). This model may be more flexible than shared 303 or virtual-dedicated 304 hosting because customers may be provided complete control over the server, including the ability to customize its hardware, software, and/or operating system. With clustered hosting 306, a computer "cluster" may comprise a plurality of communicatively coupled computers or servers working together that may appear to a user as a single computer or server. Clustered computers or servers may improve performance and/or availability over that provided by a single computer or server. The computers or servers in a cluster may be connected to each other, perhaps via high-speed local area networks. Accordingly, a hosted website may share the processing power of many servers, perhaps with other websites.

The predetermined bandwidth allotment 301 may comprise a predetermined amount of bandwidth 301 that may be associated with the domain name 201 and allocated for use is association with the enhanced domain name 200. The term "bandwidth" refers to the volume of data (often measured in gigabytes (GB)) transferred to or from a server during a prescribed period of time. The predetermined storage allotment 302 may comprise a predetermined amount of memory accessible via the Internet or another network that may be associated with the domain name 201 and allocated for use by the enhanced domain name 200 and/or its registrant, his computer, server, or website. The storage allotment 302 may comprise any amount of memory that may be stored on any form of data storage including, but not limited to, a file server, data server, database, and/or any network storage device having the ability to store data. Both the bandwidth 301 and storage 302 allotments may comprise components of the hosting service 300 discussed above. Alternatively, they may comprise separately-existing services.

Web space 202 may be associated with a domain name 201 by any method of linking or correlating the domain name 201 with a hosting service 300, bandwidth allotment 301, and/or storage allotment 302 known in the art or developed in the future. As a non-limiting example, a hosting service 300 (which may comprise a bandwidth allotment 301 and/or storage allotment 302) may be associated with a domain name 201 by updating the domain name's 201 "A-record" in the domain name system (DNS) zone file to ensure that the DNS uses the IP address associated with the domain name 201 for the hosting service 300. A domain name's A-record is an entry in the DNS record that maps each domain name to a specific IP address. The A-record therefore specifies the IP address to which a user or browser is directed for each domain name. The A-record may be updated manually or automatically, perhaps via specifically-written scripts or other software to accomplish this task. This update may occur during the enhanced domain name 200 providing and/or registration processes (Steps 100 and 110). Alternatively, a record correlating the domain name 201 with the web space 202 may be generated and stored, perhaps in a network storage device.

An enhanced domain name 200 user may wish to utilize the web space 202 associated with his enhanced domain name 200 to develop and publish a website that may have different features that can be implemented by various applications 203 (i.e., server or client-side software generating the requisite functionality). As non-limiting examples, such applications 203 may include a website's operating system, e-mail, online file storage (e.g., documents, videos, photos, etc.), forums, blogs, shopping cart, SSL certificates, flash, etc.

As illustrated in FIG. 3, the at least one application 203 also may comprise an email account 307 (e.g., GODADDY.COM EMAIL), a blog 308 307 (e.g., GODADDY.COM QUICK BLOGCAST), a forum 309 application, an instant messaging application 310, a website building application 311 (e.g., GODADDY.COM WEBSITE TONIGHT), an online file storage service application 312 (e.g., GODADDY.COM ONLINE FILE FOLDER AND ONLINE PHOTO FILER), a shopping cart application 313 (e.g., GODADDY.COM QUICK SHOPPING CART), an SSL certificate 314 (e.g., GODADDY.COM STANDARD, DELUXE, OR PREMIUM SSL CERTIFICATES), a website traffic improvement tool 315 (e.g., GODADDY.COM TRAFFIC BLAZER), an email marketing solution 316 (e.g., GODADDY.COM EXPRESS EMAIL MARKETING), another ecommerce solution 317, or any combination thereof.

Applications 203 may be associated with a domain name 201 by any method of linking or correlating the domain name 201 with an application 203 known in the art or developed in the future. As a non-limiting example, applications 203 may be associated with a domain name 201 by installing the applications 203 on a website resolving from the domain name 201. The website may or may not be hosted with the hosting service 300. Alternatively, a record correlating the domain name 201 with the applications 203 may be generated and stored, perhaps in a network storage device.

The enhanced domain name 200, and each of its components (i.e., a domain name 201, web space 202, and application 203) may comprise a single unit, interrelated as described above, that may be provided to second parties, offered for sale, sold, purchased, and/or registered. Alternatively, each component (i.e., a domain name 201, web space 202, and application 203) may be individually provided, offered for sale, sold, purchased, and/or registered. Thus the embodiments described herein may be practiced by a single entity, or jointly by multiple entities.

Figure 4:
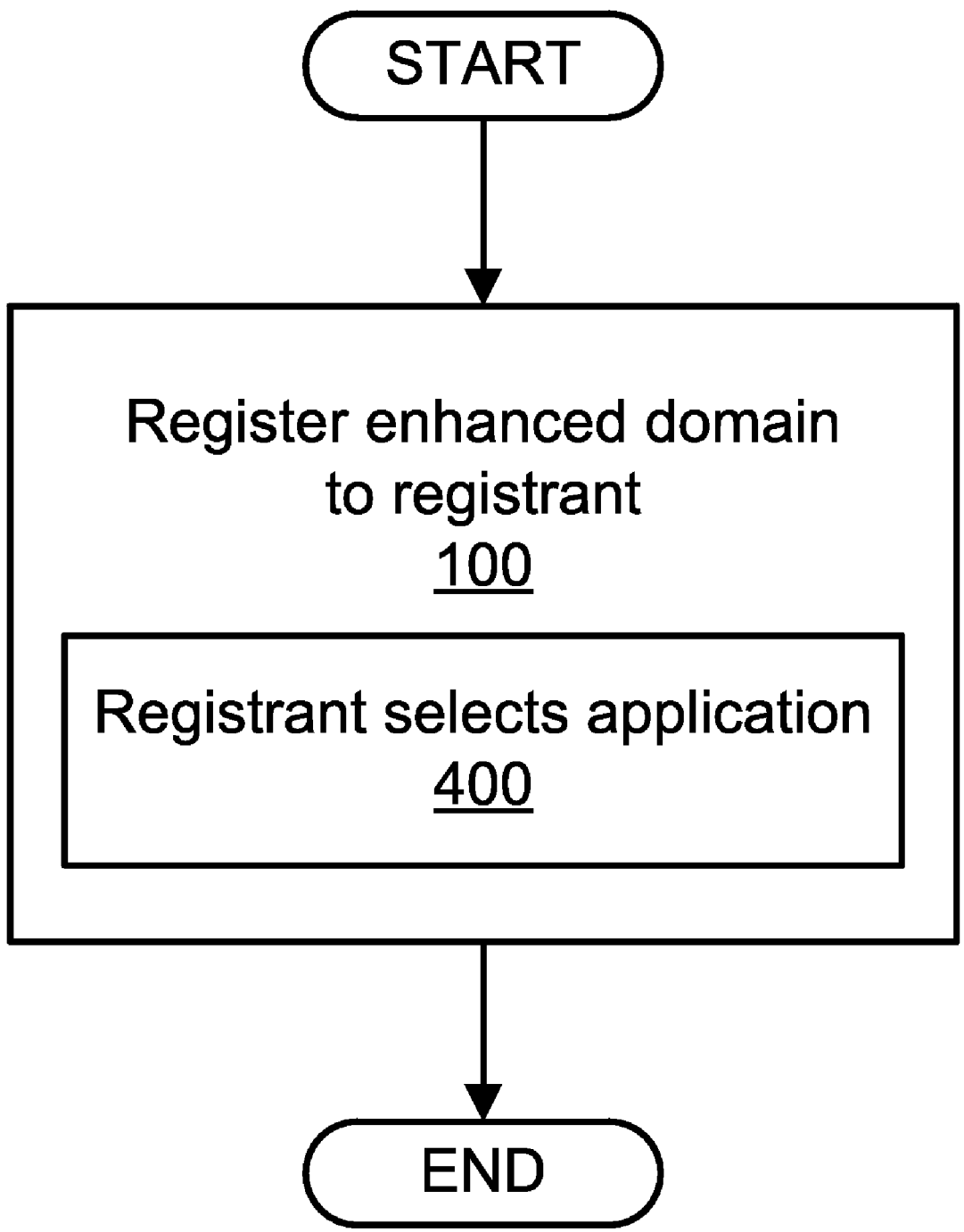
FIG. 4 is a flow diagram illustrating a possible embodiment of a method for providing an enhanced domain name.

As illustrated in FIG. 4, applications 203 may be selected by the enhanced domain registrant, perhaps while the registrant is registering the enhanced domain name 200 (Step 400). In an example embodiment, this may be accomplished via a website-enabled purchase and registration system, perhaps via a webpage allowing the registrant to select the applications 203 that he may want associated with his domain name 201. The webpage may comprise a software-implemented user interface, perhaps comprising data fields, dialog boxes, drop-down menus, lists, etc. allowing the registrant to select and/or identify applications 203.

Figure 5:
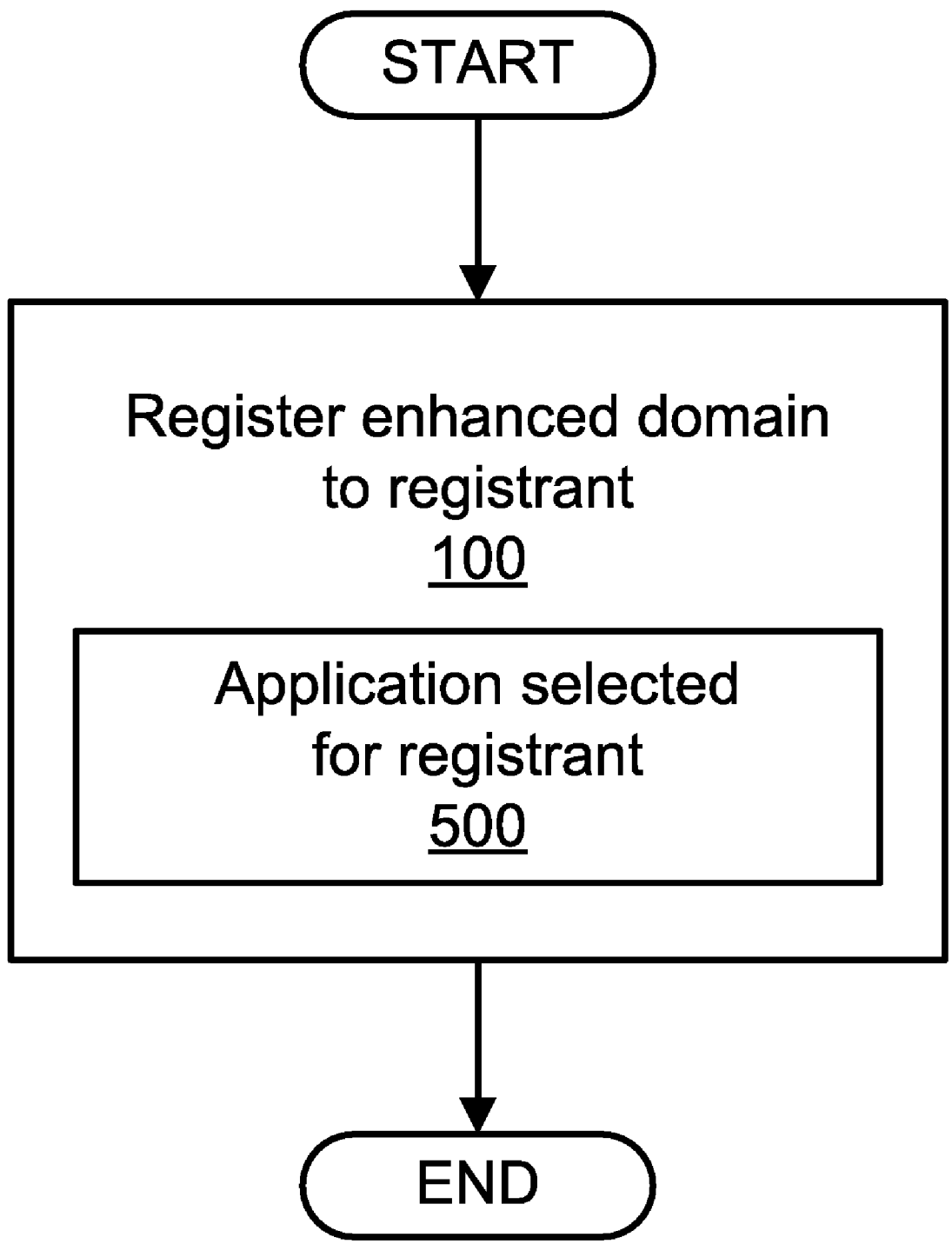
FIG. 5 is a flow diagram illustrating a possible embodiment of a method for providing an enhanced domain name.

As illustrated in FIG. 5, applications 203 may be selected for the registrant, perhaps while the registrant is registering the enhanced domain name 200 (Step 500). In one example embodiment, a predetermined set of default applications 203 may selected for the registrant. Alternatively, applications 203 may be selected by an automated application 203 selection tool, such as that described in U.S. patent application Ser. No. 12/029,062 entitled: "Systems and Methods for Recommending Website Hosting Applications," which is incorporated herein by reference and assigned to The Go Daddy Group, Inc.

Figure 6:
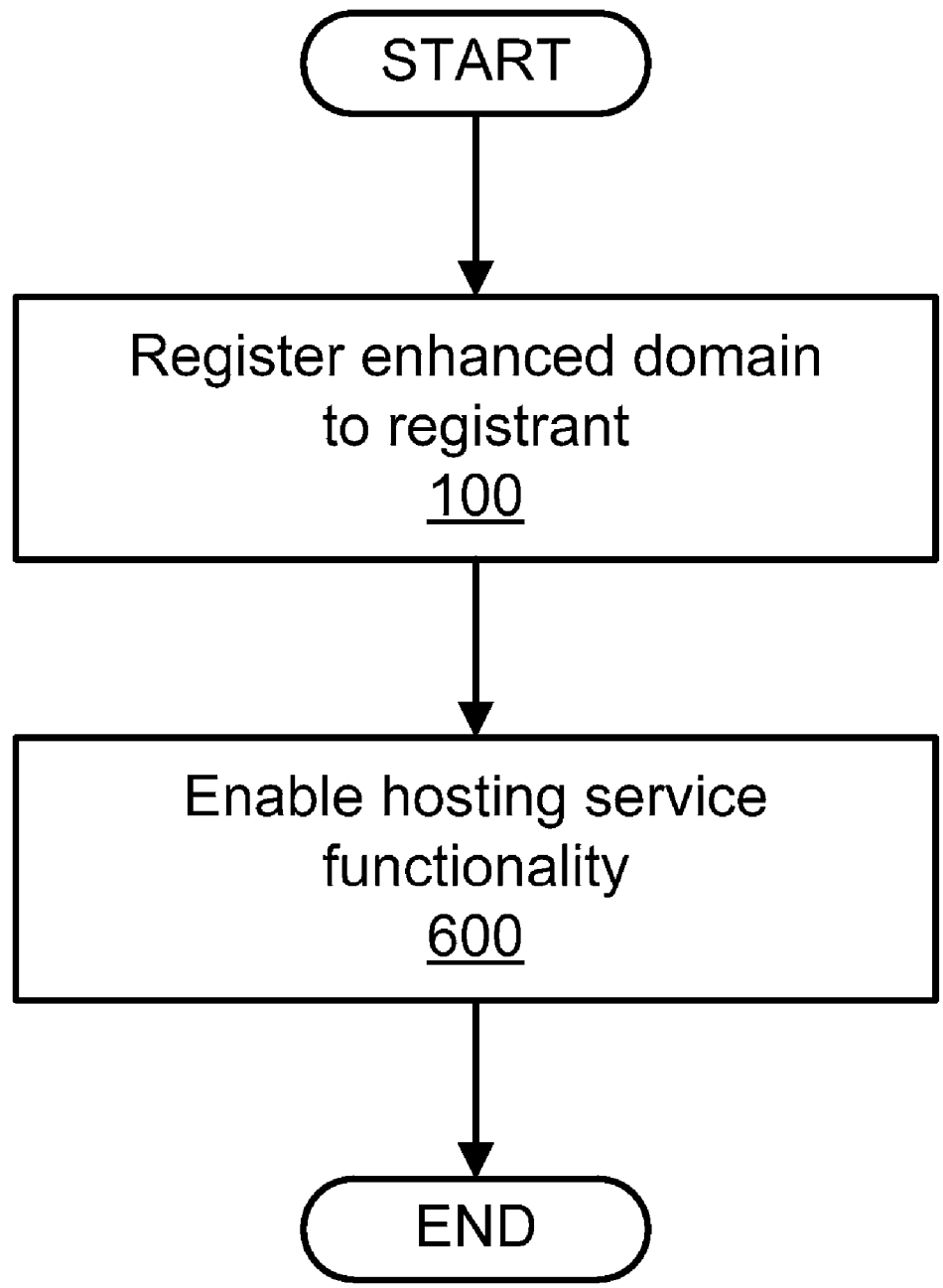
FIG. 6 is a flow diagram illustrating a possible embodiment of a method for providing an enhanced domain name.
Figure 7:
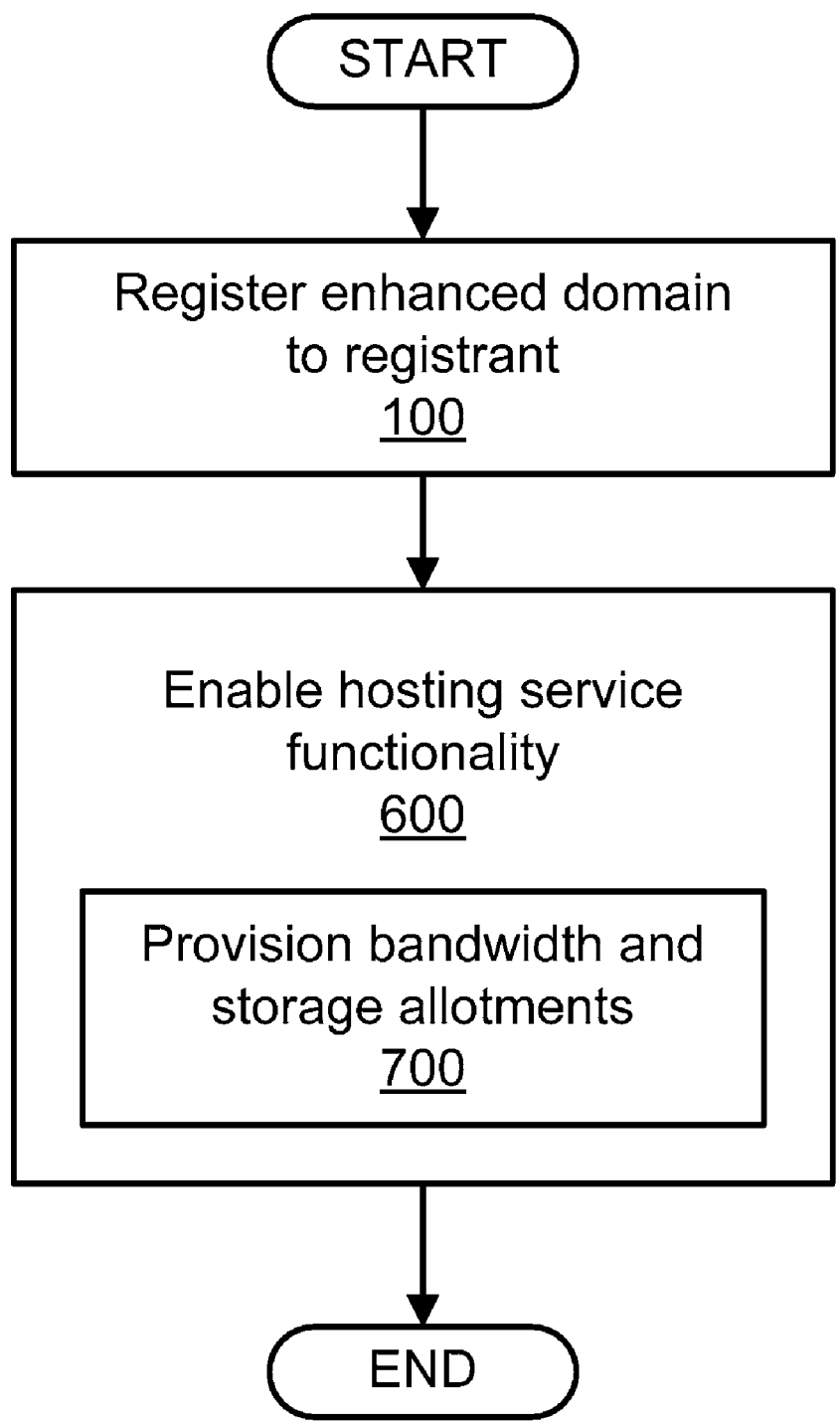
FIG. 7 is a flow diagram illustrating a possible embodiment of a method for providing an enhanced domain name.

As illustrated in FIGS. 6 and 7, the functionality of the hosting service 300 may then be enabled (Step 600), by any method of provisioning a website hosting service 300 known in the art or developed in the future. If not already accomplished as described above, the DNS A-record for the registrant's domain name 201 may be updated to reflect the IP address of the hosting service 300. A predetermined bandwidth allotment 301 and a predetermined storage allotment 302 that may be associated with the hosting service 300 may then be provisioned (Step 700) to accept data, files, and http requests. Once the DNS A-record update (mapping the hosting service 300 to the domain name 201) propagates through the DNS, the hosting service 300 functionality may be enabled.

Figure 8:
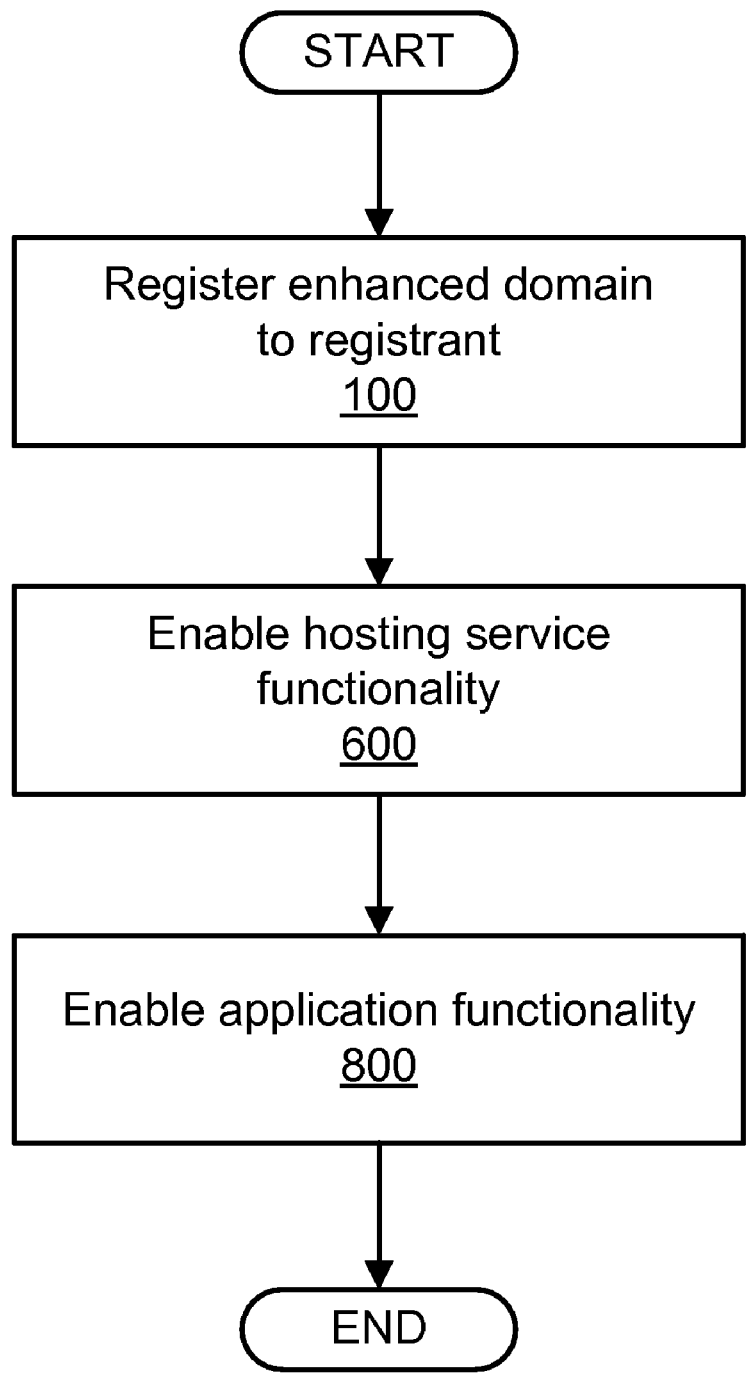
FIG. 8 is a flow diagram illustrating a possible embodiment of a method for providing an enhanced domain name.
Figure 9:
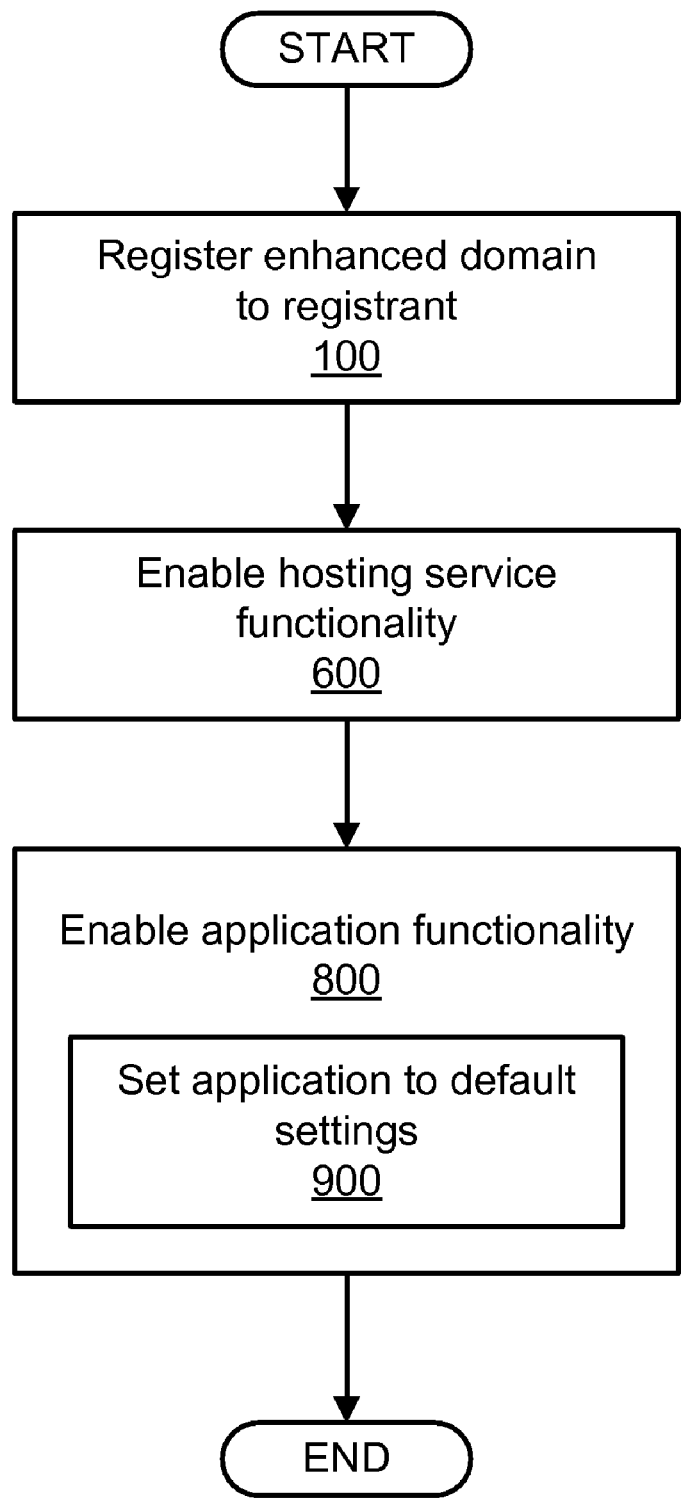
FIG. 9 is a flow diagram illustrating a possible embodiment of a method for providing an enhanced domain name.

As illustrated in FIGS. 8 and 9, the selected applications' 203 functionality may then be enabled (Step 800). This step may be accomplished by configuring an application 203 to function via a website resolving from a domain name 201. As a non-limiting example, an email application 307 associated with a domain name 201 (e.g., example.com) may be configured to have an operating email account available via the website, perhaps with registrant example.com as the functioning email address. Application 203 functionality may be enabled by setting applications 203 to predetermined default settings (Step 900). For example, a website building application 311 may automatically default to a predetermined website color, format, and number of webpages. Alternatively, the registrant may be provided the option to select application 203 settings, perhaps during the enhanced domain name 200 registration process.

Figure 10:
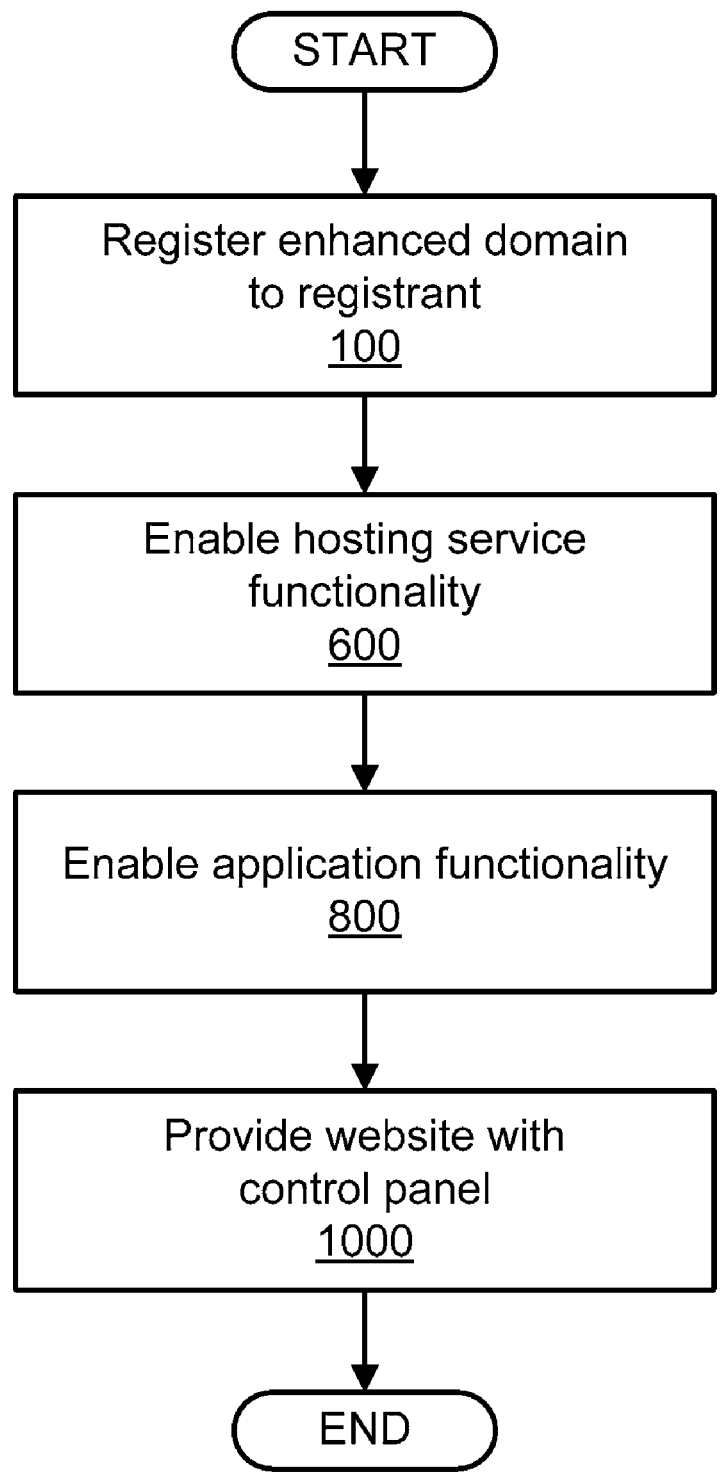
FIG. 10 is a flow diagram illustrating a possible embodiment of a method for providing an enhanced domain name.
Figure 11:
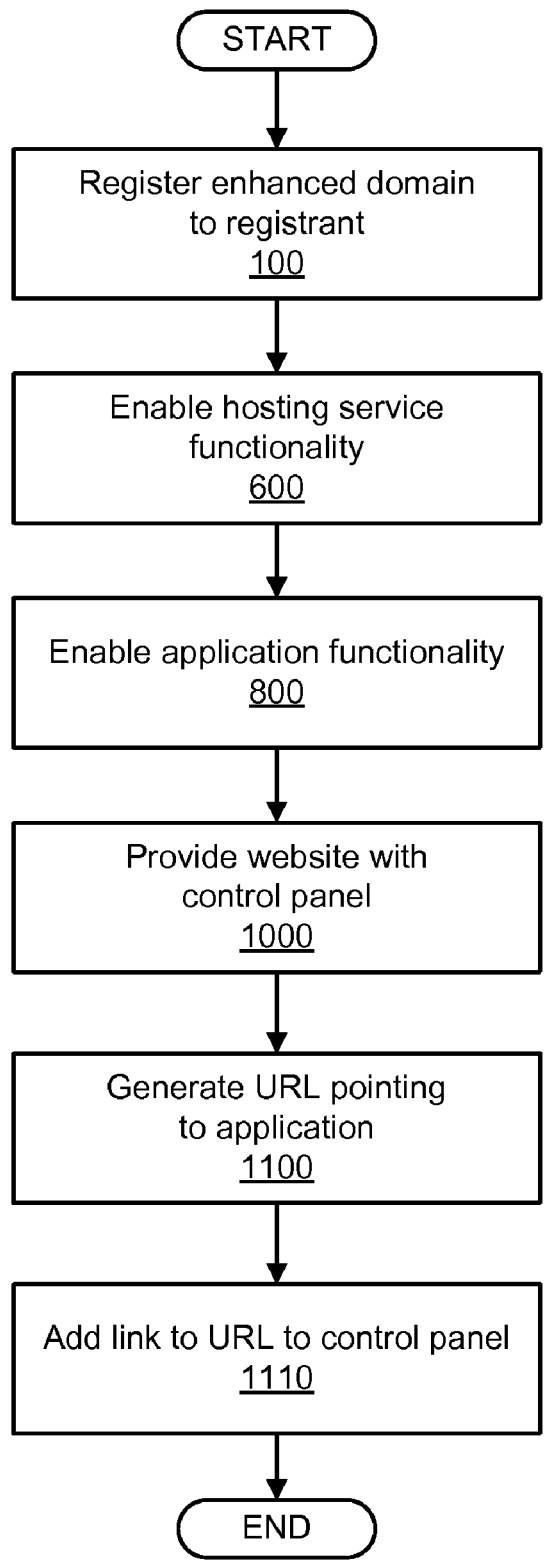
FIG. 11 is a flow diagram illustrating a possible embodiment of a method for providing an enhanced domain name.
Figure 12:
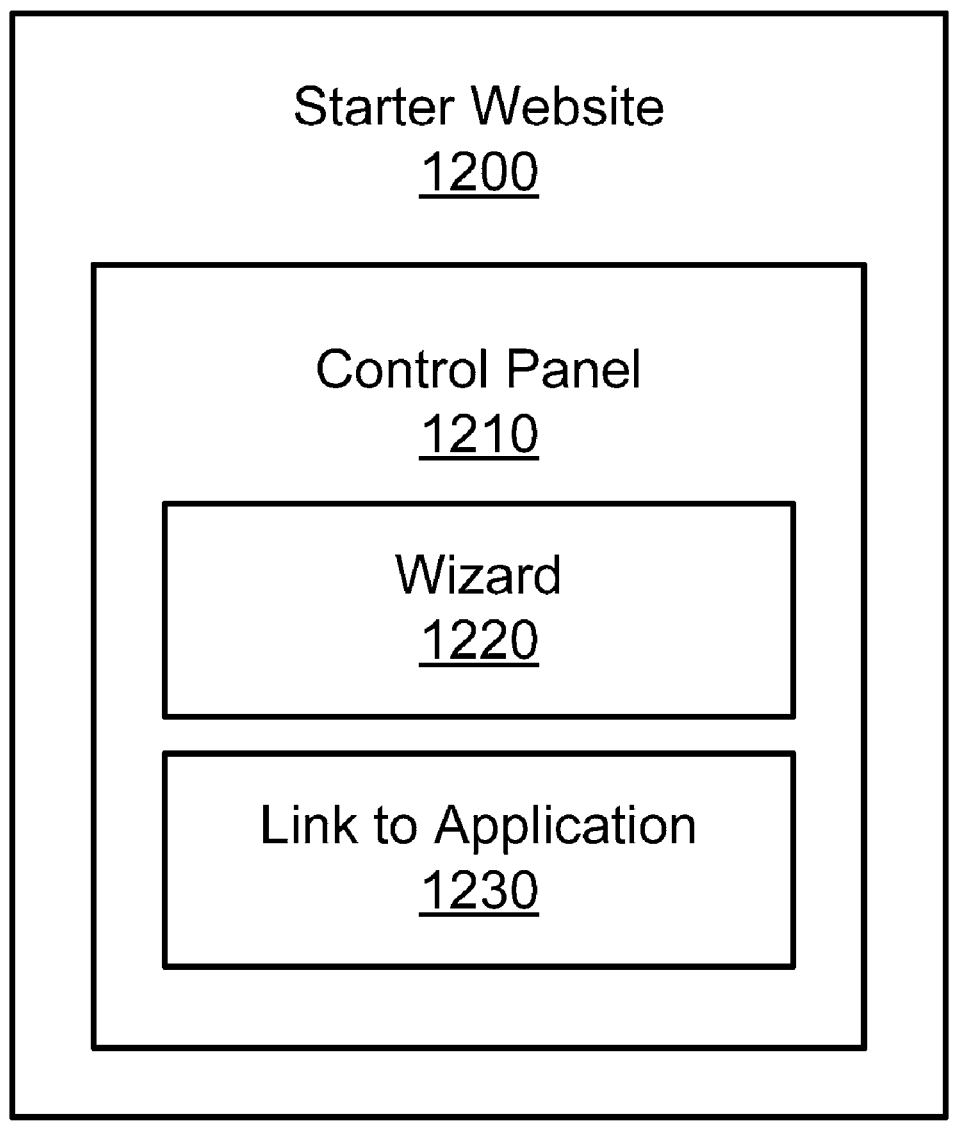
FIG. 12 illustrates a possible embodiment of a website that may be used to manage an enhanced domain name.

As illustrated in FIGS. 10, 11, and 12 a starter website 1200 may be provided (Step 1000) that resolves from the domain name 201 and has a control panel 1210 allowing the enhanced domain name 200 registrant to configure and utilize all aspects of his hosting service 300 and/or applications 203. The starter website 1200 may be hosted by the hosting service 300, or on any server or client accessible to the Internet or another network. The control panel 1210 may comprise a webpage on the starter website 1200, a plurality of webpages on the starter website 1200, or any combination thereof. As a non-limiting example, the control panel 1210 may comprise a software-implemented user interface, perhaps comprising data fields, dialog boxes, drop-down menus, lists, etc. allowing the registrant to select install, configure, and/or customize hosting service 300 and/or application 203 features and/or settings. In one embodiment, the control panel 1210 may provide tools allowing the registrant to modify default application 203 settings.

As illustrated in FIG. 12, the starter website 1200 and/or control panel 1210 also may comprise a link 1230 to each application 203. In this example embodiment, the control panel 1210 may provide either direct or indirect access to each application 203. The link 1230 may be presented on the control panel 1210 in any form known in the art or developed in the future, including, but not limited to, a window, dialog box, URL, widget/feed, or any combination thereof. Where the link 1230 comprises a URL, the URL may point to the IP address of the application server where the application 203 is stored.

As illustrated in FIG. 11, the link 1230 may comprise a unique URL generated for each application 203 by concatenating at least one subdomain to the domain name 201, wherein the unique URL points to an application 203 that may be stored on an application server (Step 1100). For example, if a registrant registers the domain name, "example.com," a subdomain (e.g., "email") then may be concatenated to "example.com" to generate a unique URL pointing to his email application 307 (e.g., "email.example.com"). Using a sampling of the applications 203 discussed above (e.g., blog 308, forum 309, instant messaging 310, etc.), additional unique URLs may be generated that point to these applications, such as "blog.example.com," "forum.example.com," and "instantmessenger.example.com." In this example embodiment, the subdomain need not have the same name as the related application 203. Any subdomain may be used, perhaps one that simply refers to the application's trade name, (e.g., "godaddymail.example.com" or "quickblogcast.example.com"). Step 1100 may be completed by mapping each unique URL to the IP address for the relevant applications server and updating the DNS record accordingly. A link to each unique URL may then be added to the control panel 1210 (Step 1110).

In an example widget/feed embodiment, the link 1230 may comprise a widget having the ability to receive a feed from an application server hosting the applications 203. A widget is a host software system for running and displaying desktop tools on the desktop that may give access to information and frequently used functions such as feeds, clocks, calendars, news aggregators, etc. A "feed" is a data format (perhaps XML-based) used for providing users with frequently-updated content. Two common feed formats that may be used with the present invention are RSS and Atom. The widget may use any of the widely-available (client or server-side) feed readers/aggregators including, but not limited to, FEEDREADER CONNECT, FEEDREADER OEM, ATTENSA FEED READERS. Alternatively, proprietary widget/feed software solutions may be used.

As illustrated in FIG. 12, the starter website 1200 and/or control panel 1210 also may comprise a wizard application 1220 for the hosting service 300 and/or each application 203. A wizard application 1220 may comprise a software application that leads a user through a series of steps needed to install, configure, and/or customize an application 203 by displaying a user interface presenting the registrant with a sequence of dialog boxes. By following the instructions and/or answering questions in the dialog boxes, the registrant may accomplish the task at hand (e.g., customizing application 203 settings). There may be one or more wizard 1220 for each application 203 and hosting service 300. The wizard 1220 may be presented on the control panel 1210 in any form known in the art or developed in the future, including, but not limited to, a window, dialog box, link, URL, widget, RSS feed, or any combination thereof.

Figure 13A:
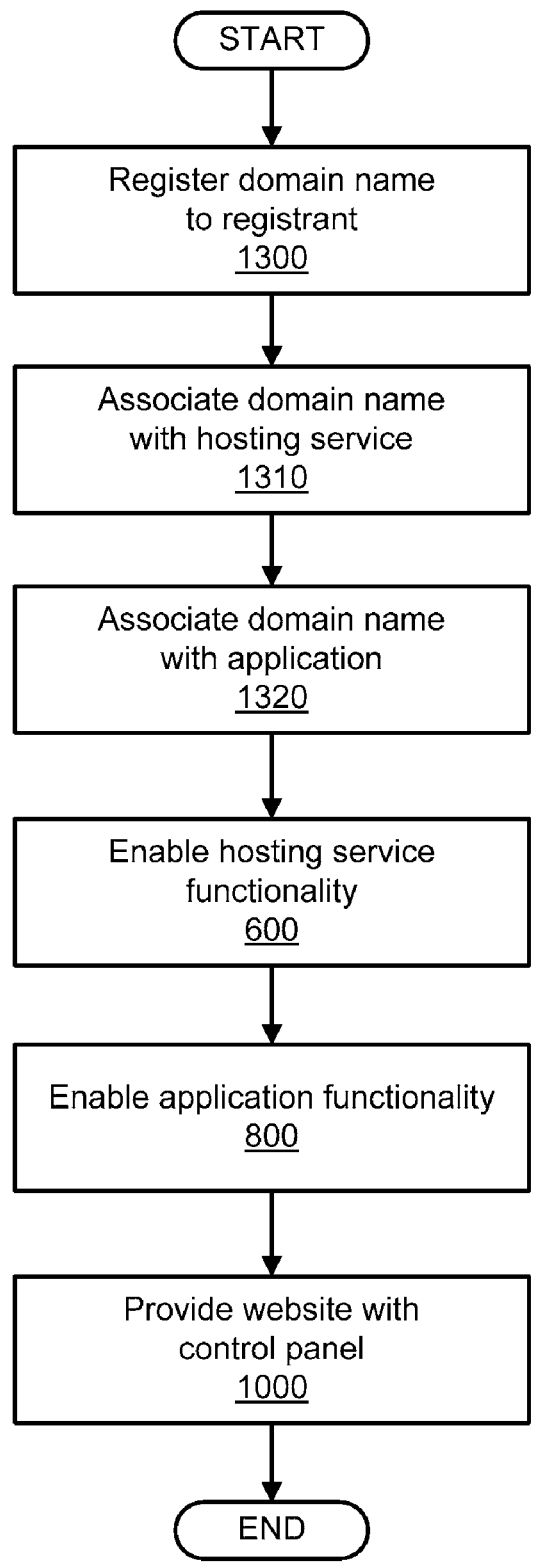
FIG. 13a is a flow diagram illustrating a possible embodiment of a method for providing an enhanced domain name.

FIG. 13a illustrates another embodiment of a method for providing an enhanced domain name 200. In this example embodiment, a domain name 201 may be registered to a registrant (Step 1300) by any domain name registration method known in the art or developed in the future, perhaps via a website-enabled domain name 201 purchase and registration system, such as that described in detail above and/or may be available on GODADDY.COM's website. During the registration process (Step 1300), as described above, the registrant may select a hosting service 300 and/or at least one application 203 for association with the domain name 201. Alternatively, a hosting service 300 and/or at least one application 203 may be selected for the registrant, perhaps comprising a predetermined (default) selection of applications 203, hosting services 300, bandwidth allotment 301, storage allotment 302, and/or any combination thereof.

Without the registrant's further participation, at least one hosting service 300 and at least one application 203 may be associated with the domain name 201 (Steps 1310 and 1320), perhaps via the methods of associating applications 203, hosting services 300, and domain names 201 described in conjunction with Step 100 above. As also described above in detail above—and also without any further participation of the registrant—the functionality of the hosting service 300 and at least one application 203 may be enabled (Steps 600 and 800), and a starter website 1200 may be provided (Step 1000) that resolves from the domain name 201. The starter website 1200 may have a control panel 1210 allowing the registrant to configure and utilize the hosting service 300 and at least one application 203.

Steps 1310, 1320, 600, and 800 may be accomplished manually, perhaps by a domain name registrar or hosting service provider offering a domain name 201 and/or an enhanced domain name 200 for sale and/or registration. Alternatively, these steps may be performed automatically, perhaps upon registration of the domain name 201 or enhanced domain name 200. As a non-limiting example, software and/or a script (a program or sequence of instructions that is interpreted or carried out by another program) may be written and implemented allowing the operating system of a server providing the hosting service 300, or perhaps an applications server storing the applications 203, to accomplish the association and/or enablement steps as described in detail above in conjunction with Step 100.

Figure 13B:
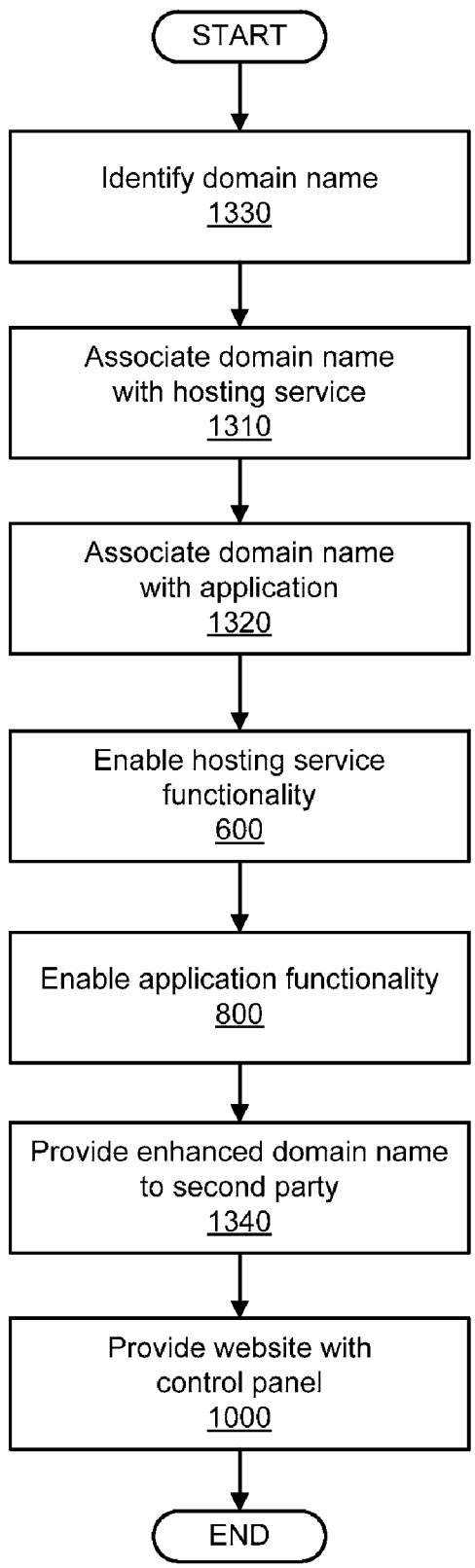
FIG. 13b is a flow diagram illustrating a possible embodiment of a method for providing an enhanced domain name.

FIG. 13b illustrates that the present inventions are not limited to being performed during the domain name registration process. Accordingly, the present inventions may be practiced at any time by, as non-limiting examples, any individual or entity including, but not limited to a domain name registry, domain name registrar, hosting provider, and/or software application developer or distributor. As illustrated in FIG. 13b, an example embodiment may comprise identifying a domain name 201 from a pool of available domain names (Step 1330). This step may be accomplished, as a non-limiting example, by searching WHOIS records to determine the availability of a domain name 201, perhaps via a domain name 201 search engine, such as is available at GODADDY.COM's website and, perhaps, registering (or otherwise reserving) the domain name 201. Alternatively, a domain name 201 registry may take advantage of their unique position as the registry for a particular TLD and set aside a plurality of domain names 201 from which the domain name 201 may be selected, perhaps without formally registering the domain name 201. A hosting service 300 and application 203 may then be associated with the domain name 201 (Steps 1310 and 1320) and the functionality of the hosting service 300 and application 203 may be enabled (Steps 600 and 800). An enhanced domain name 200 may then be provided to a second party (Step 1340). As a non-limiting example, a domain name 201 registry may accomplish this step by providing domain name registrars (or perhaps other resellers) with the bundled enhanced domain name 200 for registration to the registrars' customers. A starter website 1200 (Step 1000) may then be provided as described in detail elsewhere in this application, perhaps by the domain name 201 registry or registrar.

Figure 14:
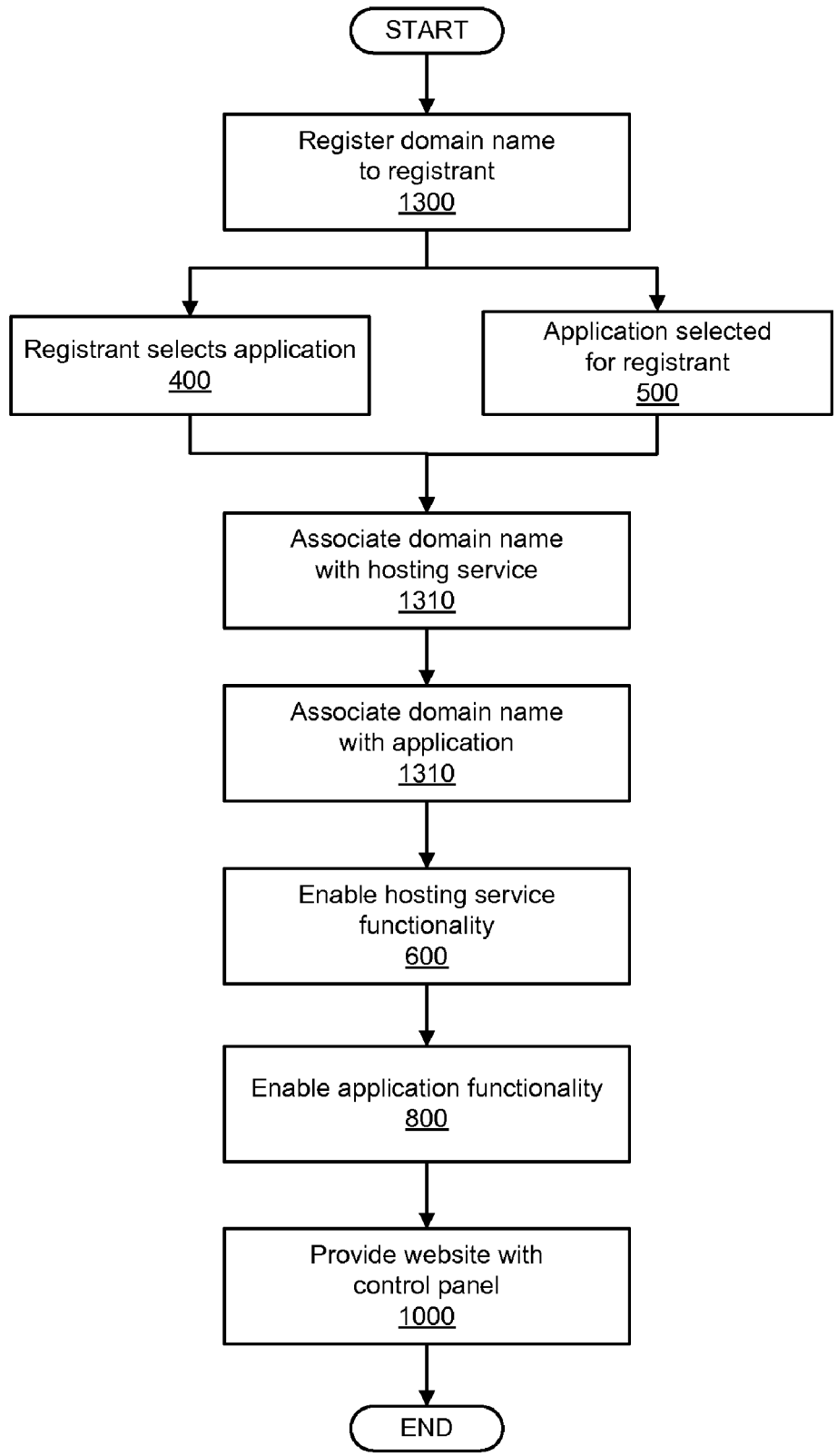
FIG. 14 is a flow diagram illustrating a possible embodiment of a method for providing an enhanced domain name.

FIG. 14 expands upon the method embodiments shown in FIG. 13a and illustrates an embodiment wherein the applications 203 may be selected by the registrant (Step 400) or, alternatively, selected for the registrant (Step 500). As illustrated, Steps 400 and 500 may be accomplished subsequent to enhanced domain name 200 registration (Step 100). Alternatively, applications 203 may be selected before or during the registration process as described in detail above.

Figure 15:
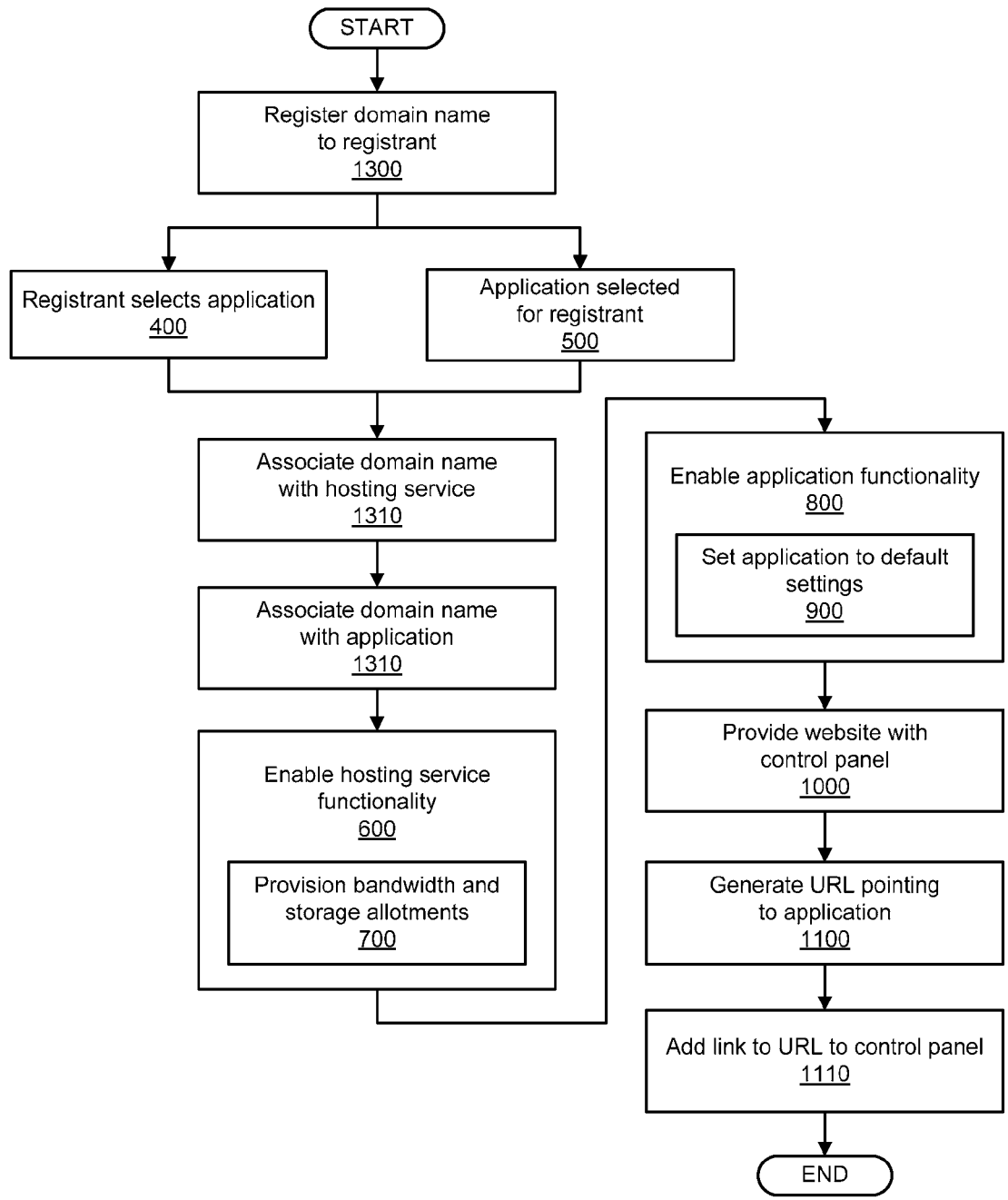
FIG. 15 is a flow diagram illustrating a possible embodiment of a method for providing an enhanced domain name.

FIG. 15 expands upon the method embodiments shown in FIGS. 13a and 14 and illustrates that hosting service 300 enablement (Step 600) may be accomplished by provisioning a predetermined bandwidth allotment 301 and a predetermined storage allotment 302 (Step 700), as described in detail above. FIG. 15 also illustrates that application enablement (Step 800) may be accomplished by setting applications 203 to default settings (Step 900). Also illustrated is the step of generating a unique URL for each application 203 by concatenating at least one subdomain to the domain name 201, wherein the unique URL points to the application 203 (Step 1100). Step 1100 may be completed by mapping each unique URL to the IP address for the relevant applications server and updating the DNS record accordingly. A link to each unique URL may then be added to the control panel 1210 (Step 1110).

Systems for Generating and Registering Enhanced Domain Names

Figure 16:
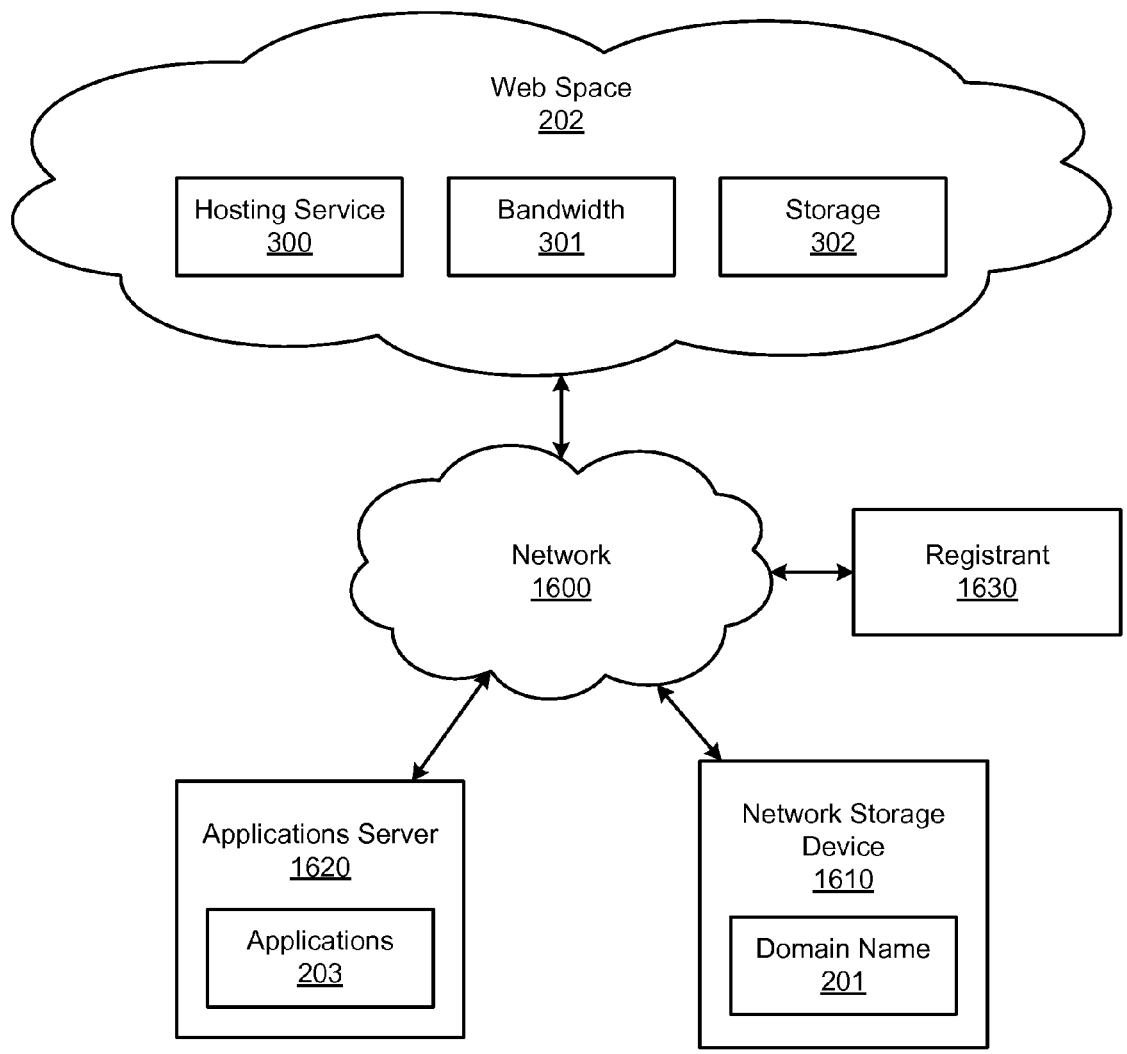
FIG. 16 illustrates a possible embodiment of a system for providing an enhanced domain name.

FIG. 16 illustrates a possible embodiment of a system for providing an enhanced domain name 200. This example embodiment may comprise a domain name 201 stored in a network storage device 1610, a web space 202 associated with the domain name 201, at least one application 203 associated with the domain name 201 and stored on at least one applications server 1620, and a network 1600 communicatively coupling the network storage device 1610, the web space 202, and the at least one application server 1620. Both the web space 202 and at least one application 203 may be automatically enabled upon association with the domain name 201 according to the methods described in detail above.

The domain name 201 may comprise a traditional domain name (as described above), the functional equivalent of a domain name, and/or any evolution of the domain name concept that may be developed in the future including, but not limited to, an enhanced domain name 200 as claimed herein. The domain name 201 may be stored in a network storage device 1610—perhaps a domain name database—that may store a plurality of registered domain names, and perhaps information regarding the registrant 1630, who may comprise an individual or an entity including, but not limited to, a person, a business, a governmental institution, an educational institution, a non-profit organization, or a social organization.

The network storage device 1610 may be maintained by a domain name registrar and, as a non-limiting example, may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future.

As described in detail above, "web space" 202—as the term is used herein—is meant to refer to any data storage and/or data transfer means used to develop and/or establish an online presence including, but not limited to, a hosting service 300, a predetermined bandwidth allotment 301, a predetermined storage allotment 302, or any combination thereof. As shown in FIG. 3, the hosting service 300 may comprise a shared hosting service 303, a virtual-dedicated hosting service 304, a dedicated hosting service 305, a clustered hosting service 306, or any combination thereof.

The at least one application 203 may comprise any server or client-side software application generating website functionality. As non-limiting examples, such applications 203 may include a website's operating system, e-mail, online file storage (e.g., documents, videos, photos, etc.), forums, blogs, shopping cart, SSL certificates, flash, etc. Applications 203 may be stored on an applications server 1620 that may comprise (as may any other server described herein), any computer or program that provides services to other computers, programs, or users either in the same computer or over a computer network. As non-limiting examples, the applications server 1620 could be an application, communication, mail, database, proxy, fax, file, media, web, peer-to-peer, or standalone server and may use any server format known in the art or developed in the future (possibly a shared hosting server, a virtual dedicated hosting server, a dedicated hosting server, clustered hosting solution, and/or any combination thereof).

The example embodiments herein place no limitation on network 1600 configuration or connectivity. Thus, as non-limiting examples, the network 1600 could comprise the Internet, the public switched telephone network, the global Telex network, computer networks (e.g., an intranet, an extranet, a local-area network, or a wide-area network), wired networks, wireless networks, or any combination thereof.

The network storage device 1610, the web space 202, and the at least one application server 1620 may be communicatively coupled to the network 1600 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (Ti, Frame Relay), Point-to-Point Protocol over Ethernet (PPPoE), and/or any combination thereof.

Figure 17:
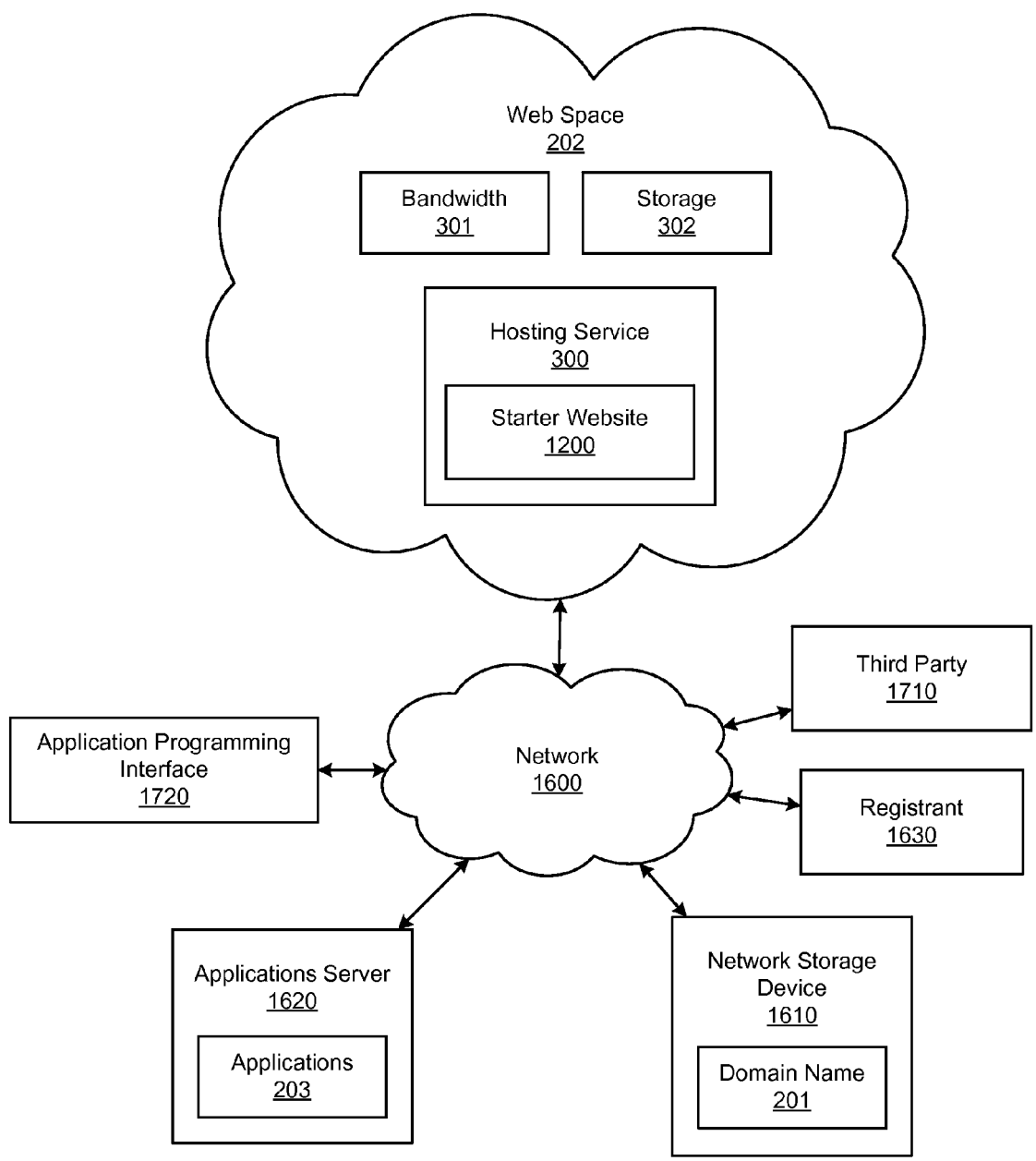
FIG. 17 illustrates a possible embodiment of a system for providing an enhanced domain name.

FIG. 17 illustrates a system that, in addition to the components shown in FIG. 16, further comprises an application programming interface (API) 1720 that may allow at least one third party 1710 to generate applications 203 that the registrant 1630 may select for association with his domain name 201 and, perhaps, inclusion on a website. An API is a software-to-software interface that specifies the protocol defining how independent computer programs interact or communicate with each other. The API 1720 may be accessible to third parties 1710 via the network 1600 and may comprise a component of the applications server 1620, hosting service 300, and/or—as illustrated in FIG. 17—may comprise a standalone tool, perhaps residing on a server communicatively coupled to the network 1600. The API 1720 may allow the third party's 1710 software to communicate and interact with the hosting service 300 and/or applications server 1620—perhaps over the network 1600—through a series of function calls (requests for services). It may comprise an interface provided by the hosting service 300 and/or applications server 1620 to support function calls made of the hosting service 300 and/or applications server 1620 by other computer programs, perhaps those utilized by the third party 1710 to generate and make available applications 203.

The API 1720 may comprise any API type known in the art or developed in the future including, but not limited to, request-style, Berkeley Sockets, Transport Layer Interface (TLI), Representational State Transfer (REST), SOAP, Remote Procedure Calls (RPC), Standard Query Language (SQL), file transfer, message delivery, and/or any combination thereof. The API 1720 may be exposed to the third party 1710 by any method known in the art or developed in the future including, but not limited to, pointing the third party 1710 to a web server to make an HTTP request in the proper function call format. The API's 1720 specification may be provided to the third party 1710, which may define the function call format required by the API 1720. The specified function call format may require identifying information from the third party 1710 that may allow the hosting service 300 and/or applications server 1620 to determine whether the third party 1710 attempting to access the API 1720 has been granted access. Access to the API 1720 may be governed by an access-protected URL that permits access only to properly-identified entities.

The example embodiment illustrated in FIG. 17 further comprises a starter website 1200 resolving from the domain name 201 that may have a control panel 1210 allowing the registrant 1630 to configure, customize, and/or utilize the web space, 202, hosting service 300, bandwidth 301 and storage 302 allotments, and applications 203. The starter website 1200 may be hosted with the hosting service 300 or, alternatively, on any client or server communicatively coupled to the network 1600 and may comprise any collection of data and/or files accessible via a browser on a client having access to the network 1600. Examples of clients that may be used include a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. As non-limiting examples, the starter website 1200 may comprise a single webpage or multiple interconnected and related webpages, each of which may provide access to multimedia content (e.g., text files, audio files, video files, graphics files, executable files, etc.). Additional embodiments of the starter website 1200 are described in detail above and further illustrated in FIG. 12.

Figure 18:
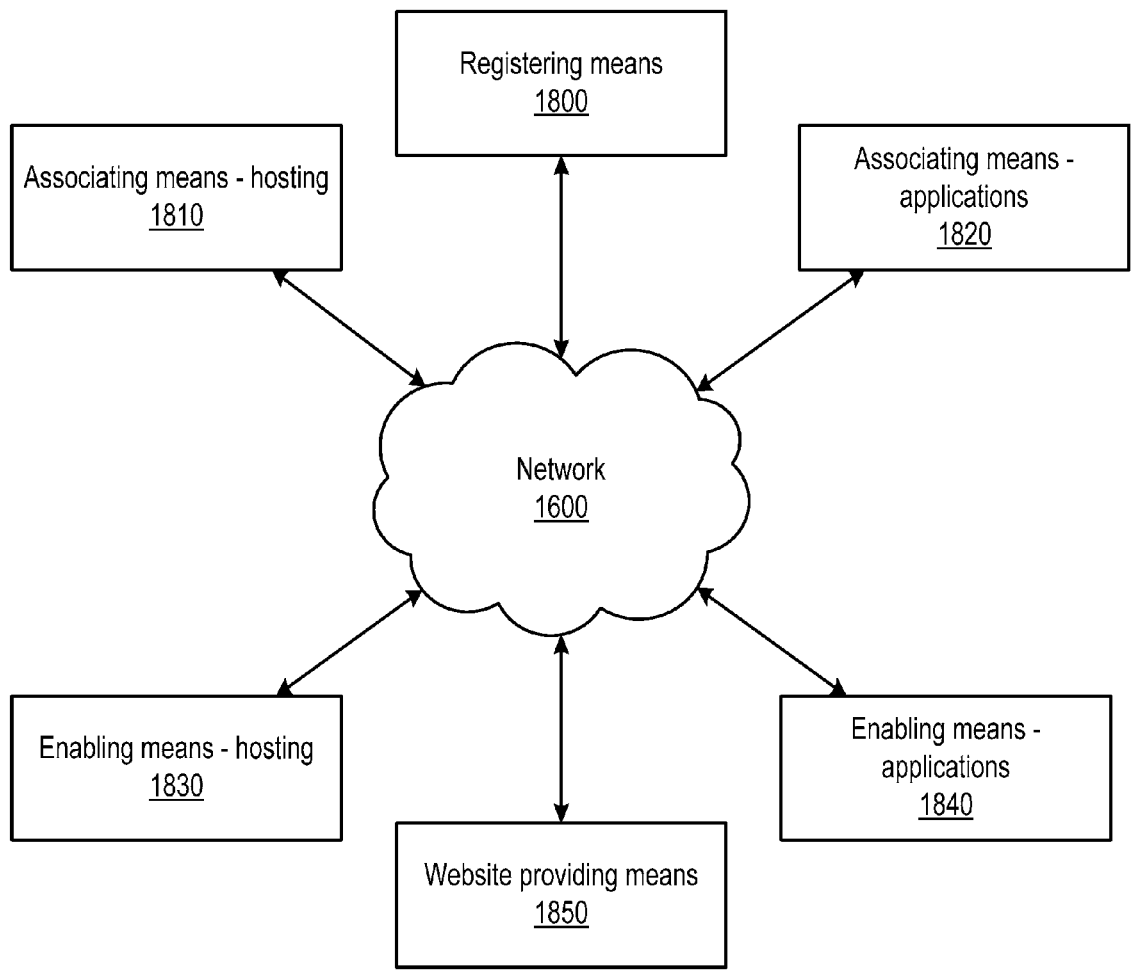
FIG. 18 illustrates a possible embodiment of a system for providing an enhanced domain name.

FIG. 18 illustrates a possible embodiment of a system for providing an enhanced domain name 200 that may comprise means 1800 for registering a domain name 201 to a registrant 1630; means 1810 for, without said registrant's 1600 further participation, associating at least one hosting service 300 with said domain name 201; means 1820 for, without said registrant's 1600 further participation, associating at least one application 203 with said domain name 201; means 1830 for, without said registrant's 1600 further participation, enabling the functionality of said at least one hosting service 300; means 1840 for, without said registrant's 1600 further participation, enabling the functionality of said at least one application 203; means 1850 for, without said registrant's 1600 further participation, providing a starter website 1200 resolving from said domain name 201, said starter website 1200 having a control panel 1210 allowing said registrant 1630 to configure and utilize said hosting service 300 and said at least one application 203; and a network 1600 communicatively coupling the above-described means.

The means 1800 for registering a domain name 201 to a registrant 1630 may comprise any domain name registration system known in the art or developed in the future including, but not limited to, a website-enabled domain name 201 purchase and registration system, such as that described in detail above and/or may be available on GODADDY.COM's website.

The means 1810 and 1820 for, without the registrant's 1600 further participation, associating at least one hosting service 300 and at least one application 203 with the domain name 201 may comprise software and/or scripts containing instructions that, when executed by a microprocessor on a server or client, cause the microprocessor to associate web space 202 and/or applications 203 with the domain name 201. Any such software and/or scripts may be stored on any server or client communicatively coupled to the network 1600, perhaps an applications server 1620 or hosting service 300 servers. Web space 202 may be associated with a domain name 201 by any method of linking or correlating the domain name 201 with a hosting service 300, bandwidth allotment 301, and/or storage allotment 302 known in the art or developed in the future. As a non-limiting example, a hosting service 300 (which may comprise a bandwidth allotment 301 and/or storage allotment 302) may be associated with a domain name 201 by updating the domain name's 201 A-record in the DNS zone file to ensure that the DNS uses the IP address associated with the domain name 201 for the hosting service 300. This update may occur during the enhanced domain name 200 registration process (Step 100). Alternatively, a record correlating the domain name 201 with the web space 202 may be generated and stored, perhaps in a network storage device. Software and/or scripts may associate the web space 202 with the domain name 201 automatically or, alternatively, the association may be performed manually, perhaps by a domain name 201 registrar after a domain name 201 is registered.

Applications 203 may be associated with a domain name 201 by any method of linking or correlating the domain name 201 with an application 203 known in the art or developed in the future. As a non-limiting example, applications 203 may be associated with a domain name 201 by installing the applications 203 on a website resolving from the domain name 201 that is hosted with a hosting service 300. Alternatively, a record correlating the domain name 201 with the applications 203 may be generated and stored, perhaps in a network storage device. Software and/or scripts may associate applications 203 with the domain name 201 automatically or, alternatively, the association may be performed manually, perhaps by a domain name registrar after a domain name 201 is registered.

The means (1830 and 1840) for, without said registrant's 1600 further participation, enabling the functionality of the hosting service 300 and/or at least one application 203 may comprise software and/or scripts containing instructions that, when executed by a microprocessor on a server or client, cause the microprocessor to enable the web space 202 and/or applications 203. Any such software and/or scripts may be stored on any server or client communicatively coupled to the network 1600. The functionality of web space 202 may be enabled (Step 600), by any method of provisioning a website hosting service 300 known in the art or developed in the future. If not already accomplished as described above, the DNS A-record for the registrant's 1600 domain name 201 may be updated to reflect the IP address of the hosting service 300. A predetermined bandwidth allotment 301 and a predetermined storage allotment 302 that may be associated with the hosting service 300 may then be provisioned (Step 700) to accept data, files, and http requests. Once the DNS A-record update (mapping the hosting service 300 to the domain name 201) propagates through the DNS, the hosting service 300 functionality may be enabled. Software and/or scripts may enable the web space 202, hosting service 300, bandwidth allotment 301, and/or storage allotment 302 automatically or, alternatively, the enablement may be performed manually, perhaps by a domain name 201 registrar after a domain name 201 is registered.

The selected applications' 203 functionality may be enabled (Step 800) by configuring an application 203 to function via a website resolving from a domain name 201. As a non-limiting example, an email application 307 associated with a domain name 201 (e.g., example.com) may be configured to have an operating email account available via the website, perhaps with registrant@example.com as the functioning email address. Application 203 functionality may be enabled by setting applications 203 to predetermined default settings (Step 900). For example, a website building application 311 may automatically default to a predetermined website color, format, and number of webpages. Alternatively, the registrant 1630 may be provided the option to select application 203 settings, perhaps during the enhanced domain name 200 registration process. Software and/or scripts may enable applications 203 automatically or, alternatively, the enablement may be performed manually, perhaps by a domain name 201 registrar after a domain name 201 is registered.

The means 1850 for, without said registrant's 1600 further participation, providing a starter website 1200 may comprise software and/or scripts containing instructions that, when executed by a microprocessor on a server or client, cause the microprocessor to generate and host a starter website 1200 accessible via the network 1600. Any such software and/or scripts may be stored on any server or client communicatively coupled to the network 1600 and may generate a starter website 1200 that may be hosted on a hosting service 300 and accessible via a browser on a client. As illustrated in FIGS. 10, 11, and 12 a starter website 1200 may resolve from the domain name 201 and has a control panel 1210 allowing the enhanced domain name 200 registrant to configure and utilize all aspects of his hosting service 300 and applications 203. Alternatively, the starter website 1200 generation means 1850 may comprise at least one individual manually generating the starter website 1200, perhaps via a website building application 311, such as GODADDY.COM's WEBSITE TONIGHT.

An Example Use of Enhanced Domain Name Systems and Methods

The systems and methods described herein may be used in many ways to, among other things, provide Internet users with a simple, quick, and effective way to establish an online presence. The described embodiments may provide Internet users with an enhanced domain name 200 that may come pre-packaged with pre-configured hosting services 300 and website applications 203 that may require no additional setup by the registrant 1630 to work. Accordingly, after the registrant 1630 registers an enhanced domain name 200 (Step 100), the registered domain name 201, when entered in a browser, may resolve to a starter website 1200 that may display a link 1230 to each application 203, which may be fully functional and ready for use. Alternatively, the starter website 1200 may display (perhaps via a widget/feed combination) a window on a control panel 1210 containing a wizard 1220 allowing the registrant to customize the functionality of each application 203.

As a non-limiting example of how such systems and methods may be used, third parties 1710, perhaps open-source software developers, may develop website applications 203

(perhaps a blog application 308 or some other ecommerce solution 717) via an exposed API 1720 on an applications server 1620. These may be added to the applications 203 available for use by Internet users who may register an enhanced domain name 200.

An Internet user, who may wish to establish an online presence, may subsequently access a domain name registrar, such as GODADDY.COM's, website and register the domain name 201 "example.com" (Step 1300). During the registration process (Step 1300), the domain name registrant 1630 may select a few software applications (Step 400) to provide functionality to a website, perhaps an email account 307, the third-party 1710 developer's blog application 308 discussed above, and a website builder 311.

Software and/or scripts running on the domain name registrar's servers may then automatically provision a hosting service 300 (perhaps provided by the domain name registrar on its servers) by updating the domain name's 201 "A-record" in the DNS zone file to ensure that the DNS uses the IP address associated with the domain name 201 for the hosting service 300. Any associated bandwidth 301 and storage 302 allotments also may be automatically provisioned. Similar software and/or scripts may then communicate with the applications server 1620 via the network 1600 and automatically install the selected applications 203 on a starter website 1200 resolving from the domain name 201. The starter website 1200 may be hosted with the domain name registrar's hosting service 300 and may act as a temporary website until the registrant 1630 decides to customize the website, perhaps via a control panel 1210 on the starter website 1200.

Specifically-written software and/or scripts running on the domain name registrar's servers may then automatically generate a unique URL for each application 203 by concatenating at least one subdomain to the domain name 201, wherein said unique URL points to said at least one application (Step 1100) (e.g., "email.example.com," "blog.example.com" and/or "websitebuilder.example.com.") The same or similar software and/or scripts may then map each unique URL to the IP address for the relevant application 203 on the applications server 1620 and update the DNS records accordingly. A link to each unique URL may then be added to the control panel 1210 (Step 1110) allowing the registrant to access the selected applications 203.

The registrant may then customize his hosting service 300 and/or applications 203 features via a wizard 1220 on the control panel 1210 that may walk the registrant 1630 through the customization process. For example, the wizard 1220 may permit the registrant 1630 to modify the appearance and theme of the starter website 1200 and, perhaps, add images via a website builder application 311, such as GODADDY. COM's WEBSITE TONIGHT. The registrant 1630 also may use the wizard 1220 to change the settings on his blog application 1710, perhaps modifying the sequence that comments are displayed.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A system, comprising:
   a) a domain name stored in a network storage device;
   b) a web space comprising:
      i) a hosting service comprising at least one server computer having an IP address,
      ii) a bandwidth allotment, and
      iii) a storage allotment,
      wherein said web space is automatically provisioned and associated with said domain name when said domain name is registered to a registrant, without input from said registrant by:
      i) adding said IP address to a DNS A-record for said domain name;
      ii) provisioning said hosting service;
      iii) provisioning said bandwidth allotment; and
      iv) provisioning said storage allotment;
   c) at least one application stored on said at least one server computer having said IP address, said at least one application being automatically enabled and associated with said domain name when said domain name is registered to said registrant, without input from said registrant, wherein said at least one application comprises server-side software providing interactive functionality to a website resolving from said domain name; and
   d) a network communicatively coupling said network storage device, said web space, and said at least one application server.

2. The system of claim 1, wherein said hosting service comprises a shared hosting service, a virtual-dedicated hosting service, a dedicated hosting service, a clustered hosting service, or any combination thereof.

3. The system of claim 1, wherein said at least one application comprises an email account, a blog, a forum, an instant messaging application, a website building application, an online file storage service application, a shopping cart application, an SSL certificate, a website traffic improvement tool, an email marketing solution, an ecommerce solution, or any combination thereof.

4. The system of claim 3, further comprising an application programming interface allowing at least one third party to generate said at least one application.

5. The system of claim 4, further comprising a starter website resolving from said domain name, said starter website having a control panel allowing a domain name registrant to configure and utilize said hosting service, said bandwidth allotment, said storage allotment, and said at least one application.

6. The system of claim 5, wherein said control panel comprises a webpage on said starter website.

7. The system of claim 5, wherein said control panel comprises a plurality of webpages on said starter website.

8. The system of claim 5, wherein said control panel comprises at least one wizard application for said hosting service and each of said at least one application.

9. The system of claim 5, wherein said control panel comprises a link to each of said at least one application.

10. The system of claim 9, wherein said link comprises a URL.

11. The system of claim 9, wherein said link comprises a widget.

* * * * *